United States Patent [19]

Addeo et al.

[11] Patent Number: 5,219,513
[45] Date of Patent: Jun. 15, 1993

[54] PROCESS FOR PREPARING STRUCTURAL, HEAT-INSULATING SHAPED BODIES, AND BODIES OBTAINED THEREBY

[75] Inventors: Antonio Addeo, Naples; Alberto Bonvivi, Milan; Francesco Mascia, Como; Lucio Pinetti, Milan, all of Italy

[73] Assignee: Centro Sviluppo Settori Impiego S.r.l., Milan, Italy

[21] Appl. No.: 794,836

[22] Filed: Nov. 21, 1991

Related U.S. Application Data

[63] Continuation of Ser. No. 568,165, Aug. 16, 1990, abandoned.

[30] Foreign Application Priority Data

Aug. 17, 1989 [IT] Italy ............... 21525 A/89

[51] Int. Cl.⁵ ................ B29C 49/04; B29C 49/20
[52] U.S. Cl. .................... 264/510; 264/515; 264/516; 156/244.14; 156/245; 156/285
[58] Field of Search ............ 264/515, 516, 172, 275, 264/278, 263, 321, 511, DIG. 10, 510, DIG. 14; 425/503, 504, 516, 520; 156/285, 286, 244.14, 245

[56] References Cited

U.S. PATENT DOCUMENTS

| | | | |
|---|---|---|---|
| 2,503,518 | 4/1950 | Slaughter | 425/516 |
| 2,575,138 | 11/1951 | Slaughter | 264/172 |
| 2,599,493 | 6/1952 | Slaughter | 264/515 |
| 3,088,166 | 5/1963 | Colombo | 264/516 |
| 3,322,869 | 5/1967 | Scott . | |
| 3,424,623 | 11/1969 | Oakley et al. . | |
| 3,705,931 | 12/1972 | Confer et al. | 264/516 |
| 3,919,374 | 11/1975 | Komendowski | 264/278 |
| 4,133,860 | 1/1979 | Sharp . | |
| 4,668,567 | 5/1987 | Williams | 264/516 |
| 4,891,000 | 1/1990 | Ishii | 264/516 |
| 4,911,878 | 3/1990 | Hopperdietzel | 264/516 |

FOREIGN PATENT DOCUMENTS

| | | | |
|---|---|---|---|
| 601344 | 7/1960 | Canada | 264/172 |
| 0103282 | 9/1983 | European Pat. Off. . | |
| 0306643 | 6/1988 | European Pat. Off. . | |
| 306923 | 3/1989 | European Pat. Off. . | |
| 2304543 | 1/1974 | Fed. Rep. of Germany | 264/515 |
| 2077383 | 10/1971 | France . | |
| 2216079 | 8/1974 | France . | |
| 55-025380 | 2/1980 | Japan | 264/516 |
| 60-232942 | 11/1985 | Japan | 264/516 |
| 486977 | 4/1978 | Switzerland | 264/321 |
| 1125609 | 8/1968 | United Kingdom . | |

OTHER PUBLICATIONS

Dylite Expandable Polystyrene, Chapter 4c, pp. 1-22.
Communication from the European Patent Office dated Mar. 18, 1992, attached to European Search Report.
Patent Abstracts of Japan, vol. 12, No. 376 (M-750) (3223) Oct. 7, 1988.

Primary Examiner—Jan H. Silbaugh
Assistant Examiner—Catherine Timm
Attorney, Agent, or Firm—Elizabeth M. Barnhard; Bryan Cave

[57] ABSTRACT

A process for preparing structural, heat-insulating shaped bodies which does not necessarily require the use of a foamed heat-insulating material obtained by the use of blowing agents belonging to the class of chlorofluorocarbons. The process includes inserting a heat-insulating pre-molded core inside a tubular element made from an extruded thermoplastic polymer; placing the extruded tubular element containing the pre-molded core into a blow-molding mold; and molding the tubular element into a shell by blow-molding. By subsequent mold closure, the shell adheres to the pre-molded core. An alternative process is disclosed for adhering the tubular element and pre-formed core by closing the mold and drawing a vacuum within the tubular element.

10 Claims, 1 Drawing Sheet

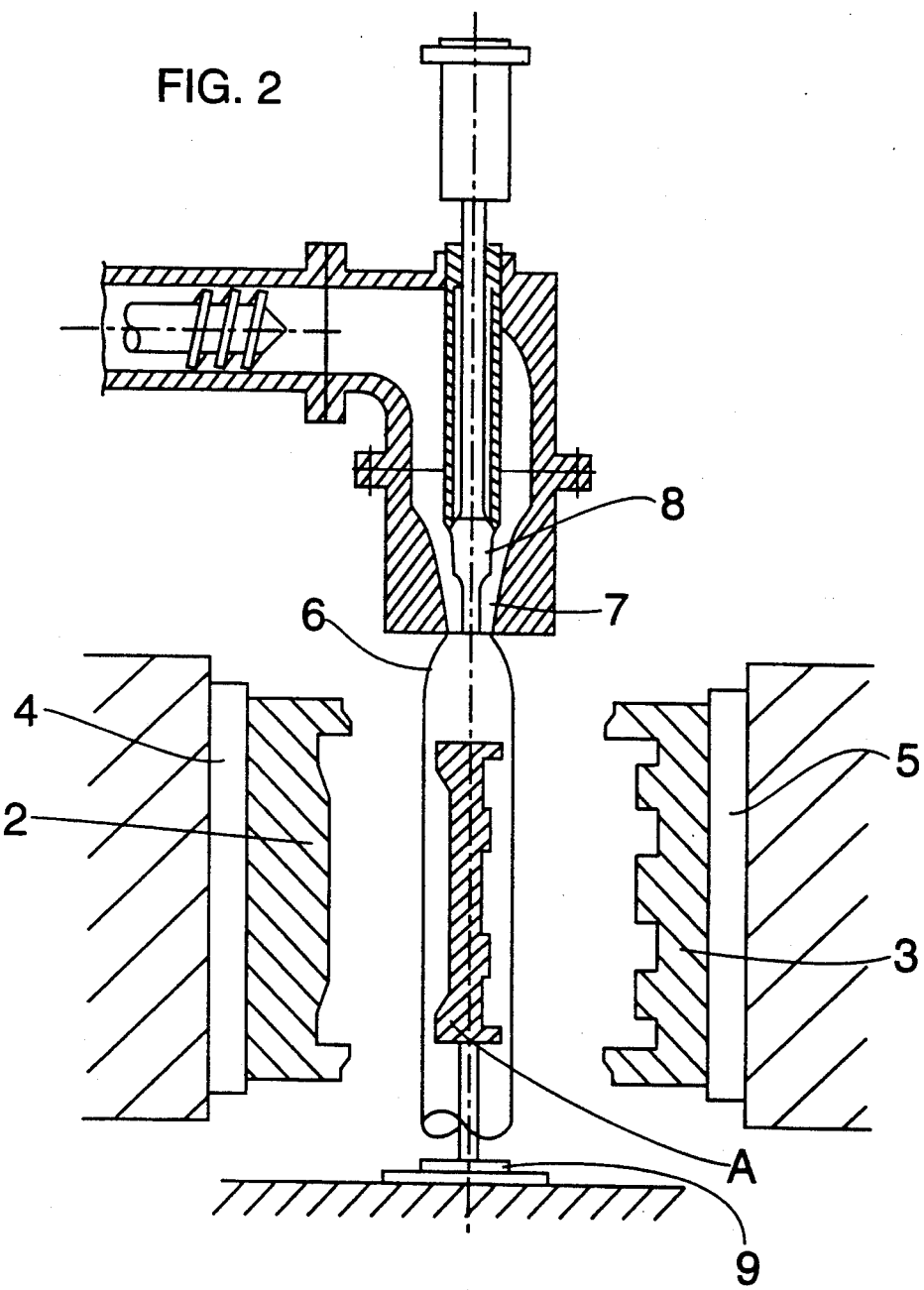

PROCESS FOR PREPARING STRUCTURAL, HEAT-INSULATING SHAPED BODIES, AND BODIES OBTAINED THEREBY

This application is a continuation of application Ser. No. 07/568,165, filed Aug. 16, 1990 now abandoned.

FIELD OF INVENTION

The present invention relates to a process for preparing structural, heat-insulating shaped bodies.

More particularly, the present invention relates to a process for preparing structural, heat-insulating shaped bodies, and to the so obtained products.

Still more particularly, the present invention relates to a process for preparing structural, heat-insulating shaped bodies which does not necessarily require the use of a foamed heat-insulating material obtained by means of the use of agents belonging to the class of chlorofluorocarbons.

By the term "shaped body", as used in the instant specification and in the thereto appended claims, any rigid, circular or polygonal structural elements for use in the sectors of transportation, of electrical home appliances, of building industry, of car industry, of telecommunications, of business machines, and so forth, as doors, covers, cases, in particular for refrigerators or freezers, panels, containers, e.g. for portable heat-insulated bags, and so forth, is meant.

BACKGROUND OF THE INVENTION

According to the prior art, the articles of the above referenced type are generally obtained by starting from two half-shells which are mechanically assembled by soldering or adhesive-bonding, with the hollow space defined inside the two half-shells being subsequently filled with foamed polyurethane.

According to another technique, disclosed in Italian patent application No. 21,815 A/87, a hollow case of thermoplastic polymer is formed by blow-molding and said hollow case is then filled with a polyurethane mixture, which is then foamed.

Foamed polyurethane, used as the heat-insulating material in both of the above described techniques, is obtained by starting from a formulation which is constituted by an organic diisocyanate, a polyol, a silicone surfactant, a polymerization catalyst and a foaming agent belonging to the class of chlorofluoroalkanes, such as FREON ®.

At present, the adoption of foamed polyurethane as a heat-insulating material causes problems of environmental character, in that the foaming agents of chlorofluoroalkane character, such as FREON ®, are regarded as one among the main causes of alteration and destruction of the ozone layer existing in the stratosphere.

Unfortunately, replacing polyurethane with an equivalent material is a problem not easily solved, in that this polymer, by being foamed in situ according to the well-known R.I.M. (Reaction Injection Molding) technique, makes it possible to obtain rigid, self-supporting structural elements even if the outer case is made from a thermoplastic polymer, and not from a metal sheet.

This desirable outcome is due to the fact that polyurethane, by reacting in situ, perfectly adheres to the inner walls of the outer case, thus forming one single structural body with them.

DETAILED DESCRIPTION OF THE INVENTION

The present Applicant has found now a process which makes it possible to obtain heat-insulating structural elements by using foamed thermoplastic materials which do not necessarily require the use of chlorofluorocarbons as the foaming agents, and which, compared to the products according to the prior art, secure equal or better insulating characteristics—with their thickness being the same—simultaneously enabling the relevant technologies of production at the industrial level to be kept nearly unchanged.

Therefore, the subject-matter of the present invention is a process for preparing structural, heat-insulating shaped bodies, which process comprises:

(a) inserting a heat-insulating pre-molded core inside a tubular element made from an extruded thermoplastic polymer, which tubular element is at a high temperature;

(b) placing said extruded tubular element containing said pre-molded core into a blow-moulding mold; and (c) molding said tubular element onto said pre-molded core.

For preparing the extruded tubular element, any thermoplastic polymers can be used. Illustrative examples comprise: polystyrene, impact-resistant polystyrene, polystyrene modified with such polar monomers as acrylonitrile, styrene alloys, such as ABS, SAN, and so forth, poly(vinyl chloride), high-density polyethylene, medium-density polyethylene, low-density polyethylene, polypropylene, ethylene/propylene copolymers, acrylic and/or methacrylic resins, polymethacrylates, polyester resins such as PET, PBT, and so forth.

Polystyrene, impact-resistant polystyrene and styrene alloys are preferred products.

The extruded tubular element, which preferably has a circular cross-section, has a wall thickness which depends on the shape and size of the end shaped body which one wants to produce, and is generally comprised within the range of from 2 to 20 mm. In order to promote the adhesion to the heat-insulated pre-molded core and the thermoforming of the tubular element, this latter is kept at a higher temperature than the softening temperature of the polymer it is made from.

The heat-insulating core is preferably made from a foamed polymeric material. Any foamed polymers can be used as contituents for the pre-molded, heat-insulating core used in the process according to the present invention, although foamed polystyrene or foamed impact-resistant polystyrene are preferred.

The pre-molded heat-insulating core, the shape of which reproduces the shape of the body which one wants to obtain, can be produced by means of techniques known from the prior art, e.g., by sintering foamed or semi-foamed pellets with steam at a temperature within the range of from 100° to 200° C.

Heat-insulating cores made from foamed polymers, having a honeycomb-shaped structure as described in technical bulletin by CIBA-GEIGY PLASTIC and marketed under the trade name HEXCEL, can be used as well.

The tubular element containing the pre-molded core is placed into a mold which reproduces, in negative, the shape of the same pre-molded element.

The tubular element can be molded onto the pre-molded core according to several techniques. One of these techniques is preferably accomplished as a double-step technique: in the first step an outer shell is formed by blow-molding the tubular element, and in the second step the so obtained shell is applied to the pre-molded core by closing and pressing the mold against said pre-molded core.

Another technique consists in only closing the mold in order to compress and adapt the tubular element around the pre-molded core. This operation can be accompanied by the simultaneous suction of air contained inside the tubular element, in order to favor the adaptation of the thermoplastic polymer to the outline of the pre-molding core.

Inasmuch as in both of said techniques the tubular element is at a higher temperature than the softening temperature of the used polymer, when the mold is closed said tubular element will perfectly adhere to the pre-molded core and will form with it an enbloc structural body.

BRIEF DESCRIPTION OF THE DRAWINGS

An exemplifying, non-limitative form of practical embodiment of the process according to the present invention is shown in the hereto attached drawing, wherein:

FIG. 1 shows the cross-section of a top of a laundry washing machine/dishwashing machine obtained by means of the process according to the present invention; and FIG. 2 shows the tubular element of thermoplastic polymer which surrounds the pre-molded core, placed into the interior of a blow-molding mould.

Referring to the figures, the top for laundry washing machine/dishwashing machine (1) comprises an inner core (A) made from a heat-insulating material, for example foamed impact-resistant polystyrene, and an outer shell (B), made from a compact impact-resistant polystyrene, perfectly adhering to the inner core and bound to it, so as to constitute one single, integral structural body.

The device for carrying out the process according to the present invention comprises a mold constituted by two half-molds (2) and (3) mounted on respective mold-holders (4) and (5). The tubular element made from the thermoplastic polymer is extruded through an annular slot (7); an axial duct (8) is provided through the die and is used in order to form the tubular element by means of the introduction of pressurized air. The tubular element surrounds the pre-molded core (A), obtained by means of techniques known from the prior art, which reproduces the shape and the dimensions of the top which one wants to produce, and is kept in its desired position by means of the support (9).

When the molding operation is carried out, an outer shell is formed by blowing air through the duct (8) into the interior of the tubular element, with the two half-molds which constitute the mold being simultaneously closed around the core (A).

Inasmuch as the tubular element is at a higher temperature than the softening temperature of the used polymer, when the mold is closed the outer shell will perfectly adhere to the pre-molded core (A), getting sealed around it and forming one single enbloc structural body with it.

We claim:

1. Process for preparing structural, heat-insulating shaped bodies, which process comprises:
   (a) inserting a heat-insulating pre-molded core made from a foamed polymeric material inside a tubular element made from an extruded thermoplastic polymer, which tubular element is at a higher temperature than the softening temperature of said polymer and is sealable to the pre-molded core;
   (b) placing said extruded tubular element containing said pre-molded core into a blow-molding mold having the negative shape of the pre-molded core shape; and
   (c) blow-molding the tubular element and closing simultaneously said mold to obtain an outer shell having the same shape as the pre-molded core, said outer shell being perfectly adhered to the pre-molded core.

2. Process according to claim 1, wherein the extruded tubular element is made from a styrene-containing polymer.

3. Process according to claim 1, wherein the extruded tubular element has a circular cross-section, and has a wall thickness within the range of from 2 to 20 mm.

4. Process according to claim 1, wherein the pre-molded core is made from foamed polystyrene.

5. Process according to claim 1, wherein the pre-molded core is made from foamed impact-resistant polystyrene.

6. Process for preparing structural heat-insulating shaped bodies, which process comprises:
   (a) inserting a heat-insulating pre-molded core made from a foamed polymeric material inside a tubular element made from an extruded thermoplastic polymer, which tubular element is at a higher temperature than the softening temperature of said polymer and is sealable to the pre-molded core;
   (b) placing said extruded tubular element containing said pre-molded core between open-mold parts having a shape which is a negative of said pre-molded core shape; and
   (c) closing the mold parts to compress the tubular element to the pre-molded core and applying vacuum inside the tubular element during the closing of said mold parts to perfect adherence of the tubular element to the pre-molded core.

7. The process according to claim 6, wherein the extruded tubular element is made from a styrene-containing polymer.

8. The process according to claim 6, wherein the extruded tubular element has a circular cross-section, and has a wall thickness within the range of from 2 to 20 mm.

9. The process according to claim 6, wherein the pre-molded core is made from foamed polystyrene.

10. The process according to claim 6, wherein the pre-molded core is made from foamed impact-resistant polystyrene.

* * * * *